United States Patent
Gong et al.

(10) Patent No.: US 11,845,073 B1
(45) Date of Patent: Dec. 19, 2023

(54) CONTINUOUS CRYSTAL TRANSFORMATION AND ION EXCHANGE DEVICE AND PROCESS

(71) Applicant: CATLION CO., LTD., Suzhou (CN)

(72) Inventors: Qiang Gong, Suzhou (CN); Yongheng Yuan, Suzhou (CN)

(73) Assignee: CATLION CO., LTD., Jiangsu (CN)

( * ) Notice: Subject to any disclaimer, the term of this patent is extended or adjusted under 35 U.S.C. 154(b) by 0 days.

(21) Appl. No.: 18/037,464

(22) PCT Filed: Apr. 30, 2021

(86) PCT No.: PCT/CN2021/091321
§ 371 (c)(1),
(2) Date: May 17, 2023

(87) PCT Pub. No.: WO2022/121223
PCT Pub. Date: Jun. 16, 2022

(30) Foreign Application Priority Data

Dec. 10, 2020 (CN) .......................... 202011431659.4

(51) Int. Cl.
*B01J 47/016* (2017.01)
*B01J 47/15* (2017.01)
*C01B 39/02* (2006.01)

(52) U.S. Cl.
CPC ............. *B01J 47/016* (2017.01); *B01J 47/15* (2017.01); *C01B 39/026* (2013.01)

(58) Field of Classification Search
CPC ........ B01J 47/016; B01J 47/15; C01B 39/026
USPC .......................................................... 502/439
See application file for complete search history.

(56) References Cited

FOREIGN PATENT DOCUMENTS

| | | |
|---|---|---|
| CN | 101890332 A | 11/2010 |
| CN | 104477937 A | 4/2015 |
| CN | 204324905 U | 5/2015 |
| CN | 104760970 A | 7/2015 |
| CN | 112191280 A | 1/2021 |
| WO | 0053530 A1 | 9/2000 |

*Primary Examiner* — Douglas B Call
(74) *Attorney, Agent, or Firm* — SZDC LAW P.C.

(57) ABSTRACT

Provided are a continuous crystal transformation and ion exchange device and process, belonging to the technical field of molecular sieve manufacturing. The continuous crystal transformation and ion exchange device comprises M+N reaction tanks which are in serial connection, wherein a feed opening of a latter reaction tank communicates with a discharge opening of a former reaction tank by means of a reaction solution circulation pipeline, and a discharge opening of an M+Nth reaction tank communicates with a feed opening of a first reaction tank by means of a reaction solution circulation pipeline. No more than M reaction tanks are used for a crystal transformation process, and no more than N reaction tanks are used for an ion exchange process. The method is used for preparing a finished zeolite molecular sieve product, and has the advantages of high exchange capacity, simple process, low cost and the like.

9 Claims, 1 Drawing Sheet

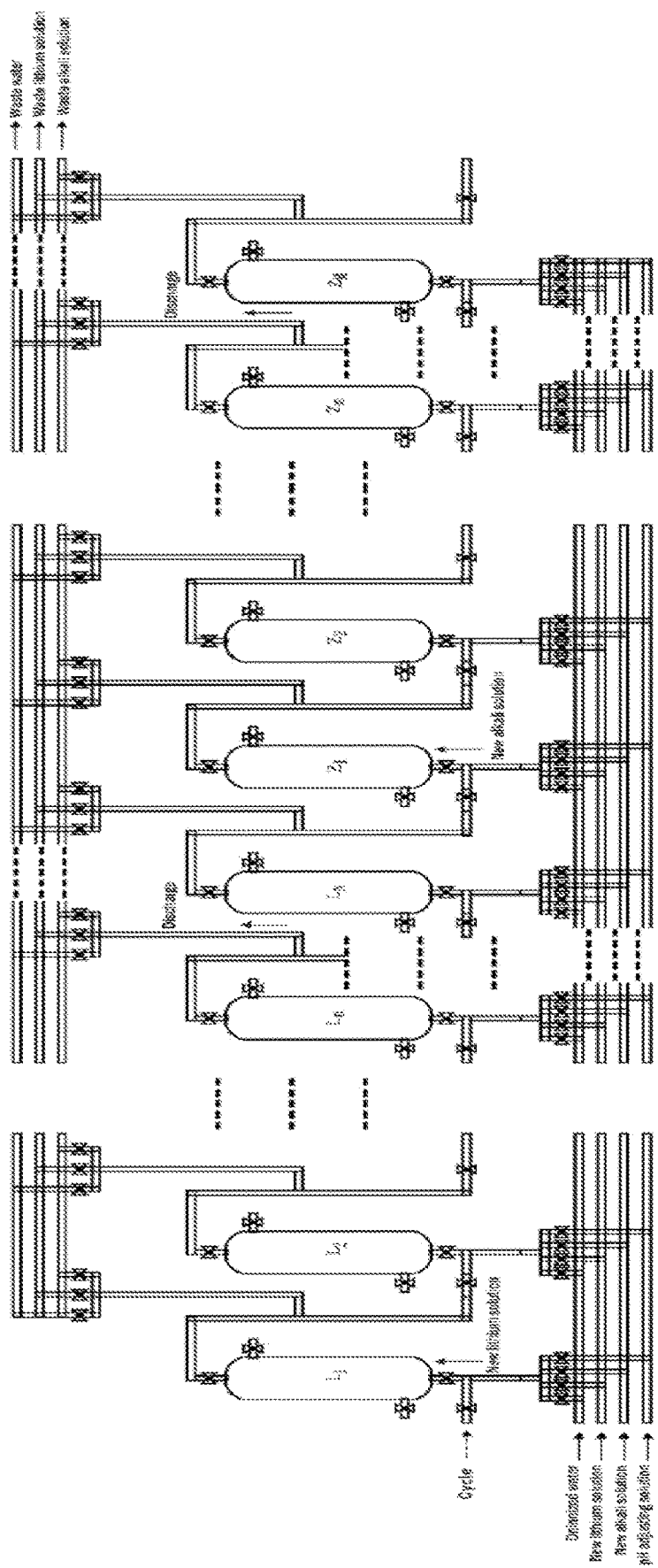

CONTINUOUS CRYSTAL TRANSFORMATION AND ION EXCHANGE DEVICE AND PROCESS

This application is the National Stage Application of PCT/CN2021/091321, filed on Apr. 30, 2021, which claims priority to Chinese Patent Application No. 202011431659.4, filed on Dec. 10, 2020, which is incorporated by reference for all purposes as if fully set forth herein.

TECHNICAL FIELD

The present invention relates to the technical field of molecular sieve manufacturing, specifically, to a continuous crystal transformation and ion exchange device and process.

BACKGROUND

Molecular sieves are originally discovered in natural minerals and are used for drying and purification of fluids at that time. With the development of science and technology, the molecular sieves are widely used in many industries, especially today's petrochemical and gas separation industries have become the largest users of the molecular sieves. Due to the shortage of natural minerals and the limitation of types, various types of molecular sieves have been synthesized artificially by using alumina, silicon oxide, alkali or clay minerals as raw materials, and have formed large-scale industrial production and application. The artificially synthesized molecular sieves are mostly powders with a size of 1-10 μm. Although this fine molecular sieve crystal has good adsorption performance, catalytic performance and thermal stability, etc., a dust space will be formed during use, the environment is polluted and the operation is also inconvenient. A certain amount of a binder must be added to molecular sieve powder to make a molecular sieve into aggregates with a required size and shape and certain mechanical strength. Bonding forming with clay and molecular sieve powder is the most commonly used method, wherein clay is generally selected from one or more of Kaolin (a main basis for synthesizing a zeolite molecular sieve with Kaolin as a raw material is a similarity of a structural composition), attapulgite, bentonite, montmorillonite, etc., the usage amount is generally 2-20 wt % of the total amount, and the properties of the formed molecular sieve vary with the type and proportion of the binder added. The function of the binder is mainly to surround the uneven surfaces of powder particles, and increase plasticity, and meanwhile, the binder has also the functions of dilution and lubrication, and reducing an internal friction. However, in a roasting forming process of the zeolite molecular sieve, the binder will generally be converted into a substance with no adsorption activity or low adsorption activity, so the addition of the binder reduces the adsorption performance, catalytic performance, thermal stability and the like of the molecular sieve. Therefore, it is a mainstream solution to produce a binder-free all-zeolite molecular sieve by using Kaolin as a binder to form a molecular sieve, followed by corresponding crystal transformation treatment. According to a related literature, Breck et al. produced a zeolite molecular sieve by roasting or thermally activating Kaolin, followed by hydrothermal treatment in an alkaline solution as early as 1974.

X-type zeolite molecular sieves with a silica-alumina ratio of 1.0-1.1 are called low-silica-alumina-ratio X-type zeolite molecular sieves (LSX). Due to the fact that $Li^+$ has the smallest radius and the largest charge density, compared with zeolite molecular sieves with $Na^+$, $Ca^{2+}$, $Mg^{2+}$ and the like, a LiX zeolite molecular sieve has better oxygen-enriching performance, and its adsorption capacity for nitrogen is 50% or above higher than that of an ordinary X-type zeolite molecular sieve, while a Li-LSX zeolite molecular sieve has greater nitrogen adsorption capacity and nitrogen-oxygen separation capacity than the ordinary X-type zeolite molecular sieve, thus showing superiority in terms of gas separation and being widely used in the industry, such as separation processes of pressure swing adsorption (PSA), vacuum pressure swing adsorption (VSA), etc. Experiments show that its nitrogen adsorption capacity will increase rapidly only when an exchange degree of Li in the Li-LSX type zeolite molecular sieve is greater than 70%. Therefore, under the situation that the price of lithium salt continues to rise and sodium ions at individual positions in a framework of the LSX zeolite molecular sieve is difficult to exchange, how to obtain a higher ion exchange degree with lower production costs and reasonable process conditions has become one of the research focuses in this field.

In a process of preparing the Li-LSX type zeolite molecular sieve from a Na-LSX type zeolite molecular sieve, the common methods are aqueous solution exchange and melt exchange, and in addition, there are methods such as non-aqueous solution exchange and steam exchange. Although the aqueous solution exchange method can achieve a high degree of exchange, it needs multiple exchanges or continuous exchanges. Because the exchange conditions are mild (the temperature is room temperature to 100° C., and the time is tens of minutes to several hours), and industrialization is easy to realize, this method is currently the most widely used in large-scale production. However, if multiple exchanges are used, after one or two exchanges, an exchange degree of subsequent exchanges will increase slowly and the exchange efficiency will decrease; while continuous exchange requires a large amount of exchange solution and waste is serious.

In China, Cui Yicheng et al. made an exchange degree of lithium ions reach 98% or more by aqueous solution multiple exchanges (Acta Chimica Sinica, 2003, 61(3): 350-353), and an exchange degree of about 96% was also obtained by Guo Daishi et al. (Ion Exchange and Adsorption, 2002, 18(6): 516-521). It is also reported abroad that Li-LSX zeolite molecular sieves with different exchange degrees are obtained by this method (USP3140933, 1964; USP5464467, 1995; USP5932509, 1999 and USP5916836, 1999). However, none of the above studies have achieved breakthroughs in these key aspects such as how to save a lithium salt and how to simplify a production process. Although a U.S. patent USP6053966 (2000) proposed to reduce the process cost by a heterogeneous adsorption process, however, this method will lead to the decline of the adsorbent performance, thus limiting its application scope.

Although a molten salt exchange method can eliminate the interference of a solvent effect, and a molten salt with high ionization performance, such as a halide, sulfate or nitrate of an alkali metal, can be used as a molten salt solution for cation exchange, it is required that the temperature for forming the molten salt solution must be lower than the destruction temperature of a zeolite structure. In addition, in addition to the cation exchange reaction in the molten salt solution, there is also a part of salts encapsulated in a zeolite cage (the degree of encapsulation is related to a size of an anion and the exchange temperature), which may form zeolite with special properties. The U.S. patent USP5916836 (1999) reported that a Li-LSX type zeolite molecular sieve with an exchange degree as high as 97% was obtained by this method. However, the disadvantages of this method, such as the influence of high temperature on a solvent, have not been well solved, and the exchange conditions are harsh and the exchange is not even, so it is less applied and reported.

In order to solve the above problems existing in the prior art, the present invention comes from this.

SUMMARY

Aiming at the shortcomings existing in the prior art, the present invention provides a continuous crystal transformation and ion exchange device and process, which are used for preparing a finished zeolite molecular sieve product, and have the advantages of high exchange capacity, simple process, low cost and the like.

The present invention relates to a continuous crystal transformation and ion exchange device, including M+N reaction tanks which are in serial connection, wherein a feed opening of a latter reaction tank communicates with a discharge opening of a former reaction tank by means of a reaction solution circulation pipeline, and a discharge opening of an M+Nth reaction tank communicates with a feed opening of a first reaction tank by means of a reaction solution circulation pipeline; wherein no more than M reaction tanks are used for a crystal transformation process, and no more than N reaction tanks are used for an ion exchange process;

all reaction tanks are each provided with four solution inlet pipelines, three solution outlet pipelines and one reaction solution circulation pipeline, wherein the four solution inlet pipelines are a deionized water inlet pipeline, a new alkali solution inlet pipeline, a new ion exchange solution inlet pipeline and a pH adjusting solution inlet pipeline, respectively, and the three solution outlet pipelines are a waste water outlet pipeline, a waste alkali solution outlet pipeline and a waste ion exchange solution outlet pipeline, respectively; and pipelines communicating with reaction tanks are controlled to be opened and closed by valves.

In some technical solutions, m reaction tanks are crystal transformation process reaction tanks for loading molecular sieve raw materials for crystal transformation; M-m reaction tanks are ion exchange process transition reaction tanks for loading intermediate products to be subjected to ion exchange after crystal transformation; n reaction tanks are ion exchange process reaction tanks for loading intermediate products for ion exchange; and N-n reaction tanks are crystal transformation process transition reaction tanks for loading molecular sieve raw materials to be subjected to crystal transformation; wherein m is not greater than M, and n is not greater than N.

The present invention relates to a continuous crystal transformation and ion exchange process, including the following processes based on the continuous crystal transformation and ion exchange device:

in one cycle, introducing a new alkali solution into a first crystal transformation process reaction tank of the m crystal transformation process reaction tanks, introducing a reaction solution flowing out of the first crystal transformation process reaction tank into a second crystal transformation process reaction tank as a primary alkali solution, and introducing a reaction solution flowing out of the second crystal transformation process reaction tank into a third crystal transformation process reaction tank as a secondary alkali solution, and so on until a reaction solution flowing out of an mth crystal transformation process reaction tank is discharged as a waste alkali solution; after a period of time, first completing molecular sieve crystal transformation in the first crystal transformation process reaction tank, and closing a new alkali solution inlet pipeline and a reaction solution circulation pipeline of the first crystal transformation process reaction tank to convert the first crystal transformation process reaction tank into an ion exchange process transition reaction tank; before a next cycle starts, connecting at least one of the remaining cleaned ion exchange process transition reaction tanks to a tail of an ion exchange process cycle in sequence, using one of the connected ion exchange process transition reaction tanks as a last ion exchange process reaction tank, using the second crystal transformation process reaction tank in this cycle as a first crystal transformation process reaction tank in a next cycle, and then starting a new cycle; and before the new cycle starts, guaranteeing at least one of the ion exchange process transition reaction tanks to complete a cleaning operation for being connected to the tail of the ion exchange process cycle;

while introducing the new alkali solution into the first crystal transformation process reaction tank of the m crystal transformation process reaction tanks, introducing a new ion exchange solution into a first ion exchange process reaction tank of the n ion exchange process reaction tanks, introducing a reaction solution flowing out of the first ion exchange process reaction tank into a second ion exchange process reaction tank as a primary ion exchange solution, and introducing a reaction solution flowing out of the second ion exchange process reaction tank into a third ion exchange process reaction tank as a secondary ion exchange solution, and so on until a reaction solution flowing out of an nth ion exchange process reaction tank is discharged as a waste ion exchange solution; after a period of time, first completing molecular sieve ion exchange in the first ion exchange process reaction tank, and closing a new ion exchange solution inlet pipeline and a reaction solution circulation pipeline of the first ion exchange process reaction tank to convert the first ion exchange process reaction tank into a crystal transformation process transition reaction tank; before a next cycle starts, connecting at least one of crystal transformation process transition reaction tanks with molecular sieve raw materials replaced to a tail of a crystal transformation process cycle in sequence, using one of the connected crystal transformation process transition reaction tanks as a last crystal transformation process reaction tank, using the second ion exchange process reaction tank in this cycle as a first ion exchange process reaction tank in a next cycle, and then starting a new cycle; and before the new cycle starts, guaranteeing at least one of the crystal transformation process transition reaction tanks to complete an operation of replacing molecular sieve raw materials for being connected to the tail of the crystal transformation process cycle; and achieving continuous crystal transformation and ion exchange through cycles.

The operation process of replacing the molecular sieve raw materials is as follows: firstly, a finished zeolite molecular sieve product is washed with deionized water, and then discharged, and finally, new molecular sieve raw materials are loaded.

After a first cycle is finished, a flow direction of liquid is switched by a valve, a second crystal transformation process reaction tank is used as a first crystal transformation process reaction tank in a next cycle, and a second ion exchange process reaction tank is used as a first ion exchange process reaction tank in the next cycle to start a second cycle; after the second cycle is finished, a third crystal transformation process reaction tank is used as a first crystal transformation process reaction tank in a next cycle, and a third ion exchange process reaction tank is used as a first ion exchange process reaction tank in the next cycle to start a third cycle; and so on, and in all previous cycles, continuous dynamic switching is carried out to keep the number of the crystal transformation process reaction tanks and the number of the ion exchange process reaction tanks unchanged.

A first crystal transformation process reaction tank in each cycle is a reaction tank where a new alkali solution is introduced, and a first ion exchange process reaction tank in each cycle is a reaction tank where a new ion exchange solution is introduced. The new alkali solution includes at least one of lithium hydroxide, potassium hydroxide, sodium hydroxide, calcium hydroxide and magnesium hydroxide, preferably sodium hydroxide or potassium hydroxide. The new ion exchange solution is a solution corresponding to target ions in a finished molecular sieve obtained by an ion exchange process;

for calcium-type molecular sieves, the new ion exchange solution may be a calcium chloride solution; and for lithium-type molecular sieves, the new ion exchange solution may be at least one of a lithium sulfate solution, a lithium chloride solution and a lithium nitrate solution, preferably the lithium sulfate solution; adoption of lithium sulfate has the following advantages: lithium chloride is corrosive to equipment due to the presence of chloride ions, which has high requirements for equipment materials; due to the presence of the chloride ions, the treatment of waste liquid is troublesome and environmentally unfriendly; due to the presence of nitrate ions, a pollution index of total nitrogen in wastewater will increase, and the control of total nitrogen emission is very strict at present; compared with the chloride ions, sulfate ions are larger and easier to clean, and when the sulfate ions are used as a special adsorbent, there will be no secondary pollution from sulfate ions, and the amount of waste liquid treatment is reduced due to the small impact of sulfate on the environment.

In the above-mentioned crystal transformation and ion exchange reaction, according to a process flow, a corresponding amount of pH adjusting solution is introduced into a corresponding reaction tank to stabilize a pH value of each reaction tank. The pH adjusting solution includes at least one of lithium hydroxide, potassium hydroxide, sodium hydroxide, calcium hydroxide and magnesium hydroxide, and lithium hydroxide is preferred for the lithium-type molecular sieves.

Preferably, all the reaction tanks are arranged in a space with constant temperature control.

The molecular sieve raw materials refer to a low-silica sodium type molecular sieve, a low-silica sodium-potassium type molecular sieve, a 4A molecular sieve and a 5A molecular sieve, and the molecular sieve raw materials contain Kaolin and/or a Yanggan clay binder. The intermediate products are all-zeolite molecular sieves obtained by a crystal transformation process.

Technical Effect

Compared with the prior art, the present invention has the following technical effects:

1) because a principle of the crystal transformation process and a principle of the ion exchange process are basically the same, the crystal transformation process and the ion exchange process are combined, so that crystal transformation and ion exchange are carried out continuously to form an integrated full-flow zeolite molecular sieve preparation process method and device, which can be used for preparing a single type molecular sieve (such as a lithium-type molecular sieve), and can also be used for preparing a cationic mixed-type molecular sieve;

2) taking the lithium-type molecular sieve as an example, in the process of ion exchange, the concentration of the ion exchange solution decreases immediately after an ion exchange solution enters the molecular sieve; however, a solution flowing out of a reaction tank still contains a considerable proportion of lithium, and the utilization rate of the reaction solution is improved by introducing a reaction solution into a next reaction tank where full exchange is not performed for an exchange reaction instead of directly discharging the reaction solution as a waste liquid; this process is repeated until a last reaction tank has no exchange effect or an outlet solution no longer contains lithium; by continuously introducing a new ion exchange solution, lithium ions are fully utilized and the conversion rate of ion exchange is improved; and similar to the above principle, in the crystal transformation process, multiple reaction tanks are used, which can make full use of effective ingredients in an alkali solution and improve the utilization efficiency of raw materials and the production efficiency; and 3) by setting up the transition reaction tanks, the continuity of the cycle of the crystal transformation process and the ion exchange process is further improved.

BRIEF DESCRIPTION OF THE DRAWINGS

FIG. 1 is a flow chart of a cycle process of Example 1.

DETAILED DESCRIPTION

The present invention will be described in detail below with reference to the accompanying drawings and specific embodiments. The experimental methods without specific conditions in the Examples are carried out according to conventional methods and conditions.

Example 1

As shown in FIG. 1, this example includes: M+N reaction tanks which are in serial connection, wherein a feed opening of a latter reaction tank communicates with a discharge opening of a former reaction tank by means of a reaction solution circulation pipeline, and a discharge opening of an M+Nth reaction tank communicates with a feed opening of a first reaction tank by means of a reaction solution circulation pipeline.

All reaction tanks are each provided with four solution inlet pipelines, three solution outlet pipelines and one reaction solution circulation pipeline, wherein the four solution inlet pipelines are a deionized water inlet pipeline, a new alkali solution inlet pipeline, a new lithium solution inlet pipeline and a pH adjusting solution inlet pipeline, respectively, and the three solution outlet pipelines are a waste water outlet pipeline, a waste alkali solution outlet pipeline and a waste lithium solution outlet pipeline, respectively.

All reaction tanks are arranged in a space with constant temperature control.

This example is illustrated by taking FIG. 1 as an example, wherein reaction tanks numbered $Z_1$ to $Z_m$ are crystal transformation process reaction tanks, and reaction tanks numbered $Z_{m+1}$ to $Z_M$ are crystal transformation process transition reaction tanks; reaction tanks numbered $L_1$ to $L_n$, are lithium-ion exchange process reaction tanks, and reaction tanks numbered $L_{n+1}$ to $L_N$ are lithium-ion exchange process transition reaction tanks; and this example is used for the preparation of a lithium-type molecular sieve.

In one cycle, a new alkali solution is introduced into the reaction tank numbered $Z_1$ for a crystal transformation reaction, a reaction solution flowing out of the reaction tank $Z_1$ is introduced into the reaction tank $Z_2$ as a primary alkali solution to continue the crystal transformation reaction, and a reaction solution flowing out of the reaction tank $Z_2$ is introduced into the reaction tank $Z_3$ as a secondary alkali solution to continue the crystal transformation reaction; and so on until a reaction solution flowing out of the reaction tank $Z_{m-1}$ is introduced into the reaction tank $Z_m$ as an m-1th alkali solution to continue the crystal transformation reaction, and a reaction solution flowing out of the reaction tank $Z_m$ is discharged as a waste liquid through a waste alkali solution outlet pipeline; after the crystal transformation reaction in the reaction tank $Z_1$ is sufficient, the reaction tank $Z_1$ is cleaned with deionized water and is then used as a new lithium-ion exchange process transition reaction tank; and in a next cycle, the reaction tank $Z_{m+1}$ cleaned by deionized water is connected to a tail of a crystal transformation process cycle as a last crystal transformation process reaction tank;

while for the lithium-ion exchange process reaction tanks, in this cycle, a new lithium solution is introduced into the reaction tank numbered $L_1$ for a lithium-ion exchange reaction, a reaction solution flowing out of the reaction tank $L_1$ is introduced into the reaction tank $L_2$ as a primary lithium solution to continue the lithium-ion exchange reaction, and a reaction solution flowing out of the reaction tank $L_2$ is introduced into the reaction tank $L_3$ as a secondary lithium solution to continue the lithium-ion exchange reaction; and so on until a reaction solution flowing out of the reaction tank $L_{n+1}$ is introduced into the reaction tank $L_3$ as an n-1th lithium solution to continue the lithium-ion exchange reaction, and a reaction solution flowing out of the reaction tank $L_n$ is discharged as a waste liquid through a waste lithium solution outlet pipeline; after the lithium-ion exchange reaction in the reaction tank $L_1$ is sufficient, the reaction tank $L_1$ is cleaned with deionized water, discharged and replaced with new molecular sieve raw materials to be used as a new crystal transformation process transition reaction tank; and in a next cycle, the heated reaction tank $L_{n+1}$ with molecular sieve raw materials replaced is connected to a tail of a lithium-ion exchange process cycle as a last lithium-ion exchange process reaction tank.

After a first cycle is finished, a flow direction of liquid is switched by a valve, a second crystal transformation process reaction tank is used as a first crystal transformation process reaction tank in a next cycle, and a second lithium-ion exchange process reaction tank is used as a first lithium-ion exchange process reaction tank in the next cycle to start a second cycle; after the second cycle is finished, a third crystal transformation process reaction tank is used as a first crystal transformation process reaction tank in a next cycle, and a third lithium-ion exchange process reaction tank is used as a first lithium-ion exchange process reaction tank in the next cycle to start a third cycle; and so on, and in all previous cycles, continuous dynamic switching is carried out to keep the number of the crystal transformation process reaction tanks and the number of the lithium exchange process reaction tanks unchanged.

A first crystal transformation process reaction tank in each cycle is a reaction tank where a new alkali solution is introduced, and a first lithium-ion exchange process reaction tank in each cycle is a reaction tank where a new lithium solution is introduced. The new alkali solution is preferably sodium hydroxide or potassium hydroxide. The new lithium solution is preferably lithium sulfate.

In the above-mentioned crystal transformation and lithium-ion exchange reaction, according to a process flow, a corresponding amount of pH adjusting solution is introduced into a corresponding reaction tank to stabilize a pH value of each reaction tank. The pH adjusting solution is preferably lithium hydroxide.

In this example, M=8 and N=9; 5 crystal transformation process reaction tanks, 6 lithium-ion exchange process reaction tanks, 3 crystal transformation process transition reaction tanks and 3 lithium-ion exchange process transition reaction tanks are provided; the molecular sieve raw materials are a low-silica sodium-potassium type molecular sieve NaK-LsX; a flow rate of each reaction tank at the corresponding discharge opening is set to be 9 L/min, the time of one cycle is 8 hours, and the lithium-ion exchange rate is 98%-98.5%.

It should be emphasized that the above is only a preferred example of the present invention, and is not intended to limit the present invention in any form. Any simple changes, equivalent variations and modifications made to the above example according to the technical substance of the present invention are still within the scope of the technical solution of the present invention.

The invention claimed is:

1. A continuous crystal transformation and ion exchange device, characterized by comprising: M+N reaction tanks which are in serial connection, wherein a feed opening of a latter reaction tank communicates with a discharge opening of a former reaction tank by means of a reaction solution circulation pipeline, and a discharge opening of an M+Nth reaction tank communicates with a feed opening of a first reaction tank by means of a reaction solution circulation pipeline; wherein no more than M reaction tanks are used for a crystal transformation process, and no more than N reaction tanks are used for an ion exchange process;

all reaction tanks are each provided with four solution inlet pipelines, three solution outlet pipelines and one reaction solution circulation pipeline, wherein the four solution inlet pipelines are a deionized water inlet pipeline, a new alkali solution inlet pipeline, a new ion exchange solution inlet pipeline and a pH adjusting solution inlet pipeline, respectively, and the three solution outlet pipelines are a waste water outlet pipeline, a waste alkali solution outlet pipeline and a waste ion exchange solution outlet pipeline, respectively; and pipelines communicating with reaction tanks are controlled to be opened and closed by valves.

2. The continuous crystal transformation and ion exchange device according to claim 1, characterized in that, m reaction tanks are crystal transformation process reaction tanks for loading molecular sieve raw materials for crystal transformation; M-m reaction tanks are ion exchange process transition reaction tanks for loading intermediate products to be subjected to ion exchange after crystal transformation; n reaction tanks are ion exchange process reaction tanks for loading intermediate products for ion exchange; and N-n reaction tanks are crystal transformation process transition reaction tanks for loading molecular sieve raw materials to be subjected to crystal transformation.

3. A continuous crystal transformation and ion exchange process, characterized by comprising the following processes based on the continuous crystal transformation and ion exchange device of claim 2:

in one cycle, introducing a new alkali solution into a first crystal transformation process reaction tank of the m crystal transformation process reaction tanks, introducing a reaction solution flowing out of the first crystal transformation process reaction tank into a second crystal transformation process reaction tank as a primary alkali solution, and introducing a reaction solution flowing out of the second crystal transformation process reaction tank into a third crystal transformation process reaction tank as a secondary alkali solution, and so on until a reaction solution flowing out of an mth crystal transformation process reaction tank is discharged as a waste alkali solution; after a period of time, first completing molecular sieve crystal transformation in the first crystal transformation process reaction tank, and closing a new alkali solution inlet pipeline and a reaction solution circulation pipeline of the first crystal transformation process reaction tank to convert the first crystal transformation process reaction tank into an ion exchange process transition reaction tank; before a next cycle starts, connecting at least one of the remaining cleaned ion exchange process transition reaction tanks to a tail of an ion exchange process cycle in sequence, using one of the connected ion exchange process transition reaction tanks as a last ion exchange process reaction tank, using the second crystal transformation process reaction tank in this cycle as a first crystal transformation process reaction tank in a next cycle, and then starting a new cycle; and before the new cycle starts, guaranteeing at least one of the ion exchange process transition reaction tanks to complete a cleaning operation for being connected to the tail of the ion exchange process cycle;

while introducing the new alkali solution into the first crystal transformation process reaction tank of the m crystal transformation process reaction tanks, introducing a new ion exchange solution into a first ion exchange process reaction tank of the n ion exchange process reaction tanks, introducing a reaction solution flowing out of the first ion exchange process reaction tank into a second ion exchange process reaction tank as a primary ion exchange solution, and introducing a reaction solution flowing out of the second ion exchange process reaction tank into a third ion exchange process reaction tank as a secondary ion exchange solution, and so on until a reaction solution flowing out of an nth ion exchange process reaction tank is discharged as a waste ion exchange solution; after a period of time, first completing molecular sieve ion exchange in the first ion exchange process reaction tank, and closing a new ion exchange solution inlet pipeline and a reaction solution circulation pipeline of the first ion exchange process reaction tank to convert the first ion exchange process reaction tank into a crystal transformation process transition reaction tank; before a next cycle starts, connecting at least one of crystal transformation process transition reaction tanks with molecular sieve raw materials replaced to a tail of a crystal transformation process cycle in sequence, using one of the connected crystal transformation process transition reaction tanks as a last crystal transformation process reaction tank, using the second ion exchange process reaction tank in this cycle as a first ion exchange process reaction tank in a next cycle, and then starting a new cycle; and before the new cycle starts, guaranteeing at least one of the crystal transformation process transition reaction tanks to complete an operation of replacing molecular sieve raw materials for being connected to the tail of the crystal transformation process cycle; and achieving continuous crystal transformation and ion exchange through cycles.

4. The continuous crystal transformation and ion exchange process according to claim 3, characterized in that, after a first cycle is finished, a flow direction of liquid is switched by a valve, a second crystal transformation process reaction tank is used as a first crystal transformation process reaction tank in a next cycle, and a second ion exchange process reaction tank is used as a first ion exchange process reaction tank in the next cycle to start a second cycle; after the second cycle is finished, a third crystal transformation process reaction tank is used as a first crystal transformation process reaction tank in a next cycle, and a third ion exchange process reaction tank is used as a first ion exchange process reaction tank in the next cycle to start a third cycle; and so on, and in all previous cycles, continuous dynamic switching is carried out to keep the number of the crystal transformation process reaction tanks and the number of the ion exchange process reaction tanks unchanged.

5. The continuous crystal transformation and ion exchange process according to claim 3, characterized in that, the new alkali solution comprises at least one of lithium hydroxide, potassium hydroxide, sodium hydroxide, calcium hydroxide and magnesium hydroxide.

6. The continuous crystal transformation and ion exchange process according to claim 3, characterized in that, the new ion exchange solution is a solution corresponding to target ions in a finished molecular sieve product obtained by an ion exchange process.

7. The continuous crystal transformation and ion exchange process according to claim 3, characterized in that, in a crystal transformation and ion exchange reaction, a corresponding amount of pH adjusting solution is introduced into a corresponding reaction tank to stabilize a pH value of each reaction tank according to a process flow.

8. The continuous crystal transformation and ion exchange process according to claim 7, characterized in that, the pH adjusting solution comprises at least one of lithium hydroxide, potassium hydroxide, sodium hydroxide, calcium hydroxide and magnesium hydroxide.

9. The continuous crystal transformation and ion exchange process according to claim 3, characterized in that, all reaction tanks are arranged in a space with constant temperature control.

* * * * *